(12) United States Patent
Ogawa (10) Patent No.: US 8,612,110 B2
(45) Date of Patent: Dec. 17, 2013

(54) TRAVELING VEHICLE SYSTEM AND TRAVELING CONTROL METHOD

(75) Inventor: Kazuhiko Ogawa, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 166 days.

(21) Appl. No.: 13/177,628

(22) Filed: Jul. 7, 2011

(65) Prior Publication Data

US 2012/0006641 A1 Jan. 12, 2012

(30) Foreign Application Priority Data

Jul. 8, 2010 (JP) ................................ 2010-156202

(51) Int. Cl.
*B60L 9/00* (2006.01)
*B60L 1/00* (2006.01)

(52) U.S. Cl.
USPC ............................................... 701/70; 191/2

(58) Field of Classification Search
None
See application file for complete search history.

(56) References Cited

U.S. PATENT DOCUMENTS

| | | | |
|---|---|---|---|
| 5,677,610 A * | 10/1997 | Tanamachi et al. | 318/801 |
| 6,441,581 B1 * | 8/2002 | King et al. | 320/101 |
| 6,591,758 B2 * | 7/2003 | Kumar | 105/35 |
| 7,518,254 B2 * | 4/2009 | Donnelly et al. | 290/40 C |
| 7,565,867 B2 * | 7/2009 | Donnelly et al. | 105/62.1 |
| 7,646,156 B2 | 1/2010 | Freudelsperger | |
| 8,136,454 B2 * | 3/2012 | Barbee et al. | 105/50 |
| 2003/0151387 A1 * | 8/2003 | Kumar | 320/104 |
| 2003/0233959 A1 * | 12/2003 | Kumar | 105/26.05 |
| 2005/0000386 A1 * | 1/2005 | Inarida | 105/26.05 |
| 2006/0038524 A1 * | 2/2006 | Okamoto et al. | 318/625 |
| 2009/0259363 A1 * | 10/2009 | Li et al. | 701/36 |
| 2012/0006641 A1 * | 1/2012 | Ogawa | 191/2 |

FOREIGN PATENT DOCUMENTS

| | | | |
|---|---|---|---|
| EP | 1 538 020 A2 | 6/2005 | |
| EP | 1538020 A2 * | 6/2005 | ............... B60M 3/00 |
| JP | 02-085057 A | 3/1990 | |
| JP | 2000-201492 A | 7/2000 | |
| JP | 2005-162076 A | 6/2005 | |
| JP | 2006-062427 A | 3/2006 | |
| JP | 2008-081219 A | 4/2008 | |
| JP | 2010-011711 A | 1/2010 | |

OTHER PUBLICATIONS

Official Communication issued in corresponding Japanese Patent Application No. 2010-156202, mailed on Jun. 12, 2012.

* cited by examiner

*Primary Examiner* — Fadey Jabr
*Assistant Examiner* — Krishnan Ramesh
(74) *Attorney, Agent, or Firm* — Keating & Bennett, LLP (57) ABSTRACT

A traveling vehicle system includes traveling vehicles; a controller which controls operations of the traveling vehicles; and a power line which electrically connects the traveling vehicles with each other, and supplies electric power to each of the traveling vehicles. Each of the traveling vehicles includes a motor which runs on the electric power supplied via the power line and drives the traveling vehicle, and when decelerating, generates regenerative electric power to be supplied to another one of the traveling vehicles via the power line, and the controller controls the operations of the traveling vehicles so that a time of one or more first traveling vehicles decelerating overlaps a time of one or more second traveling vehicles accelerating, the first traveling vehicles being decelerating traveling vehicles, the second traveling vehicles being accelerating traveling vehicles, and the first traveling vehicles and the second traveling vehicles being included in the traveling vehicles.

8 Claims, 7 Drawing Sheets

TRAVELING VEHICLE SYSTEM AND TRAVELING CONTROL METHOD

The disclosure of Japanese Patent Application No. 2010-156202 filed on Jul. 8, 2010 including specification, drawings and claims is incorporated herein by reference in its entirety.

BACKGROUND OF THE INVENTION

1. Field of the Invention

The present invention relates to traveling vehicle systems including traveling vehicles and a controller to control the traveling vehicles and traveling control methods to control the traveling vehicles.

2. Description of the Related Art

Traveling vehicle systems which have been widely available in recent years include traveling vehicles and a controller. The traveling vehicles work as platforms for conveying articles, and the controller controls the traveling vehicles. In order to operate all the traveling vehicles, a traveling vehicle system needs to have the capacity of the power supply facility planned based on the total power consumed by all the traveling vehicles. Accordingly, the traveling vehicle system requires a power supply facility having a large capacity.

Thus, one of the conventional traveling vehicle systems involves storing regenerative electric power, which a decelerating traveling vehicle generates, in an auxiliary power source (See, for example, Japanese Unexamined Patent Application Publication No. 2008-81219). This system utilizes the electricity stored in the auxiliary power source for less capacity of the power supply facility.

The conventional traveling vehicle system has a problem in that the regenerative electric power is not used effectively.

Specifically, before using the regenerative electric power, the conventional traveling vehicle system stores the electric power in the auxiliary power source and discharges the power. Such storing and discharging causes a loss of the power. Due to the power loss, all the electric power that the conventional system can utilize is the power remaining after the power has been lost from the generated regenerative electric power.

SUMMARY OF THE INVENTION

In view of the above problems, preferred embodiments of the present invention provide a traveling vehicle system which can effectively utilize regenerative electric power, and a traveling control method.

A traveling vehicle system according to a preferred embodiment of the present invention includes: traveling vehicles; a controller which controls operations of the traveling vehicles; and a power line which electrically connects the traveling vehicles with each other, and supplies electric power to each of the traveling vehicles, wherein each of the traveling vehicles (i) includes a motor which runs on the electric power supplied via the power line and drives the traveling vehicle, and (ii) when decelerating, generates regenerative electric power to be supplied to another one of the traveling vehicles via the power line, and the controller controls the operations of the traveling vehicles so that a time of one or more first traveling vehicles decelerating overlaps a time of one or more second traveling vehicles accelerating, the first traveling vehicles being decelerating traveling vehicles, the second traveling vehicles being accelerating traveling vehicles, and the first traveling vehicles and the second traveling vehicles being included in the traveling vehicles.

The traveling vehicle system preferably uses the controller to control the operations of the traveling vehicles so that a time of the first traveling vehicles decelerating overlaps a time of the second traveling vehicles accelerating. In other words, the traveling vehicle system causes the first traveling vehicles to decelerate and the second traveling vehicles to accelerate at the same time in order to use the regenerative electric power generated by the decelerating first traveling vehicles to accelerate the second traveling vehicles. Accordingly, the traveling vehicle system suffers no loss of power resulting from storing and discharging of the regenerative electric power, and can efficiently use the regenerative electric power.

Preferably, the controller controls the operations of the travelling carriages so that the number of the second travelling carriages is equal to or smaller than a predetermined first number.

The controller preferably controls the operations of the traveling vehicles so that the number of the second traveling vehicles is equal to or smaller than a predetermined number. In other words, the controller limits the number of the accelerating traveling vehicles to as few as the predetermined number or smaller. This control makes possible to avoid an increase in peak power caused by the accelerating traveling vehicles, which contributes to reducing the capacity of the power supply facility.

Preferably, when the number of the first travelling carriages is greater than the number of the second travelling carriages, the controller controls the operations of the traveling vehicles so that a time of the first traveling vehicles decelerating overlaps a time of the second traveling vehicles accelerating.

When the number of the first traveling vehicles is greater than that of the second traveling vehicles, the controller controls the operations of the traveling vehicles so that a time of the first traveling vehicles decelerating overlaps a time of the second traveling vehicles accelerating. Specifically, in the case where the number of decelerating traveling vehicles is greater than that of the accelerating traveling vehicles, the controller uses the regenerative electric power generated by the deceleration of the traveling vehicles for the acceleration of the traveling vehicles. This control allows much regenerative electric power to be provided to the accelerating traveling vehicles. Thus, the regenerative electric power is efficiently used, contributing to preventing the increase in power to be used for acceleration of the traveling vehicles.

Preferably, each of the traveling vehicles further includes a driver which positions each of the traveling vehicles by driving the motor, the traveling vehicle system preferably further includes a communication line which connects the controller with each driver, and the controller controls the operations of the traveling vehicles by causing the driver to drive the motor via the communication line, so that a time of the first traveling vehicles decelerating overlaps the second traveling vehicles accelerating.

The controller controls the operations of the traveling vehicles by causing the drivers to drive the motors via the communication line, so that a time of the first traveling vehicles decelerating overlaps the second traveling vehicles accelerating. The controller sends signals which cause the drivers for traveling, including servo amplifiers, to drive the motors for traveling. Accordingly, the traveling vehicles can be easily controlled Preferably, the driver obtains a torque value of the motor of the traveling vehicle, and the controller controls the operations of the traveling vehicles by checking to see that each of the first traveling vehicles is in a decelerating state based on the torque value of the motor which the driver obtains, so that a time of the first traveling vehicles decelerating overlaps a time of the second traveling vehicles accelerating.

The controller controls the operations of the traveling vehicles by checking to see that the first traveling vehicles are in the accelerating state based on the torque values of the motors which the driver obtains, so that a time of the first traveling vehicles decelerating overlaps the second traveling vehicles accelerating. Thus, the controller uses the torque values to check the decelerating state of the traveling vehicles. Accordingly, the traveling vehicles can be easily controlled.

Preferably, the driver obtains a torque value of the motor of the traveling vehicle, and the controller controls the operations of the traveling vehicles by checking to see that each of the first traveling vehicles is in a decelerating state based on the torque value of the motor which the driver obtains, so that a time of the first traveling vehicles decelerating overlaps a time of the second traveling vehicles accelerating.

The controller controls the operations of the traveling vehicles by checking to see that the second traveling vehicles are in the accelerating state based on the torque values of the motors which the drivers obtains, so that a time of the first traveling vehicles decelerating overlaps the second traveling vehicles accelerating. Thus, the controller uses the torque values to check the decelerating state of the traveling vehicles. Accordingly, the traveling vehicles can be easily controlled.

Preferably, the controller delays the acceleration of the second traveling vehicles by estimating when the first traveling vehicles will decelerate and generate the regenerative electric power, so that a time of the first traveling vehicles decelerating overlaps a time of the second traveling vehicles accelerating.

The controller delays acceleration of the second traveling vehicles by estimating when the first traveling vehicles will decelerate and generate regenerative electric power, so that a time of the first traveling vehicles decelerating overlaps the second traveling vehicles accelerating. Thus, the controller estimates when the regenerative electric power will be generated. Accordingly, the traveling vehicles can be easily controlled.

Preferably, the controller delays the acceleration of the second traveling vehicles by anticipating that the operating traveling vehicles are to decelerate and generate the regenerative electric power when the number of traveling vehicles, among the traveling vehicles, operating at a constant speed is equal to or greater than a predetermined second number.

The controller delays acceleration of the second traveling vehicles by anticipating that the operating traveling vehicles are to decelerate and generate the regenerative electric power, when the number of the traveling vehicles operating at a constant speed is equal to or greater than a predetermined number. In other words, when there are many of the traveling vehicles operating at a constant speed, the operating traveling vehicles are expected to sequentially decelerate. In order to efficiently use the regenerative electric power to be generated through the deceleration of the operating traveling vehicles, the controller delays the acceleration of the second traveling vehicles. Thus, the regenerative electric power is efficiently used, contributing to preventing the increase in power to be used for acceleration of the traveling vehicles.

Instead of being implemented as the traveling vehicle system, other preferred embodiments of the present invention can be implemented as (i) a method to control a traveling vehicle system, the method which has characteristic processes included in the controller of the traveling vehicle system as steps, and (ii) a program causing a computer to execute such characteristic steps. As a matter of course, such a program can be distributed via a recording medium, such as a CD-ROM, and a transmission medium, such as the Internet.

The traveling vehicle system according to various preferred embodiments of the present invention effectively uses regenerative electric power.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the drawings.

Figure 1:
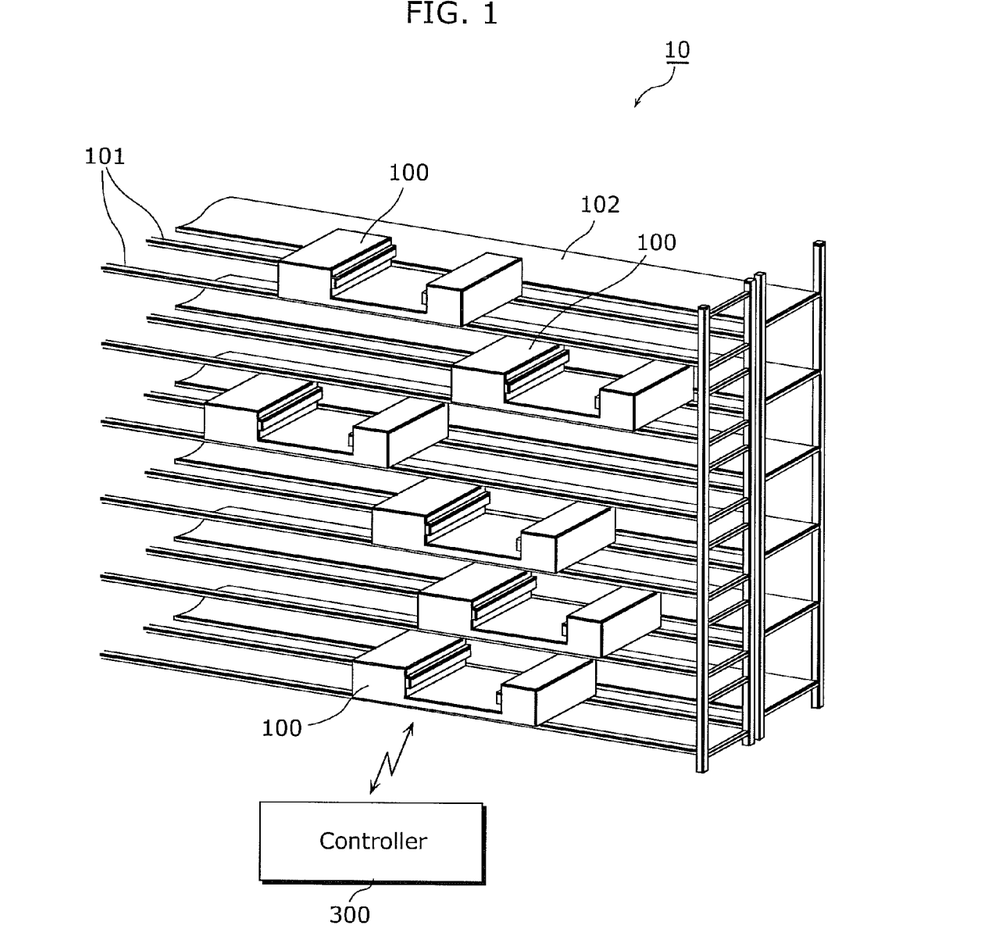
FIG. 1 is a perspective view which schematically illustrates a traveling vehicle system according to a preferred embodiment of the present invention.

FIG. 1 is a perspective view which schematically illustrates a traveling vehicle system 10 according to a preferred embodiment of the present invention.

As shown in FIG. 1, the traveling vehicle system 10 includes traveling vehicles 100, a rack 102, and a controller 300. The rack 102 includes the traveling vehicles 100 arranged along a traveling path in order to transfer articles.

Each of the traveling vehicles 100 preferably is a platform which shuttles along rails 101 in order to transfer a loaded article to the rack 102. The rails 101 function as the traveling path. The controller 300 controls the operations of the traveling vehicles 100. It is noted that the traveling vehicles 100 and the controller 300 shall be detailed later.

Figure 2:
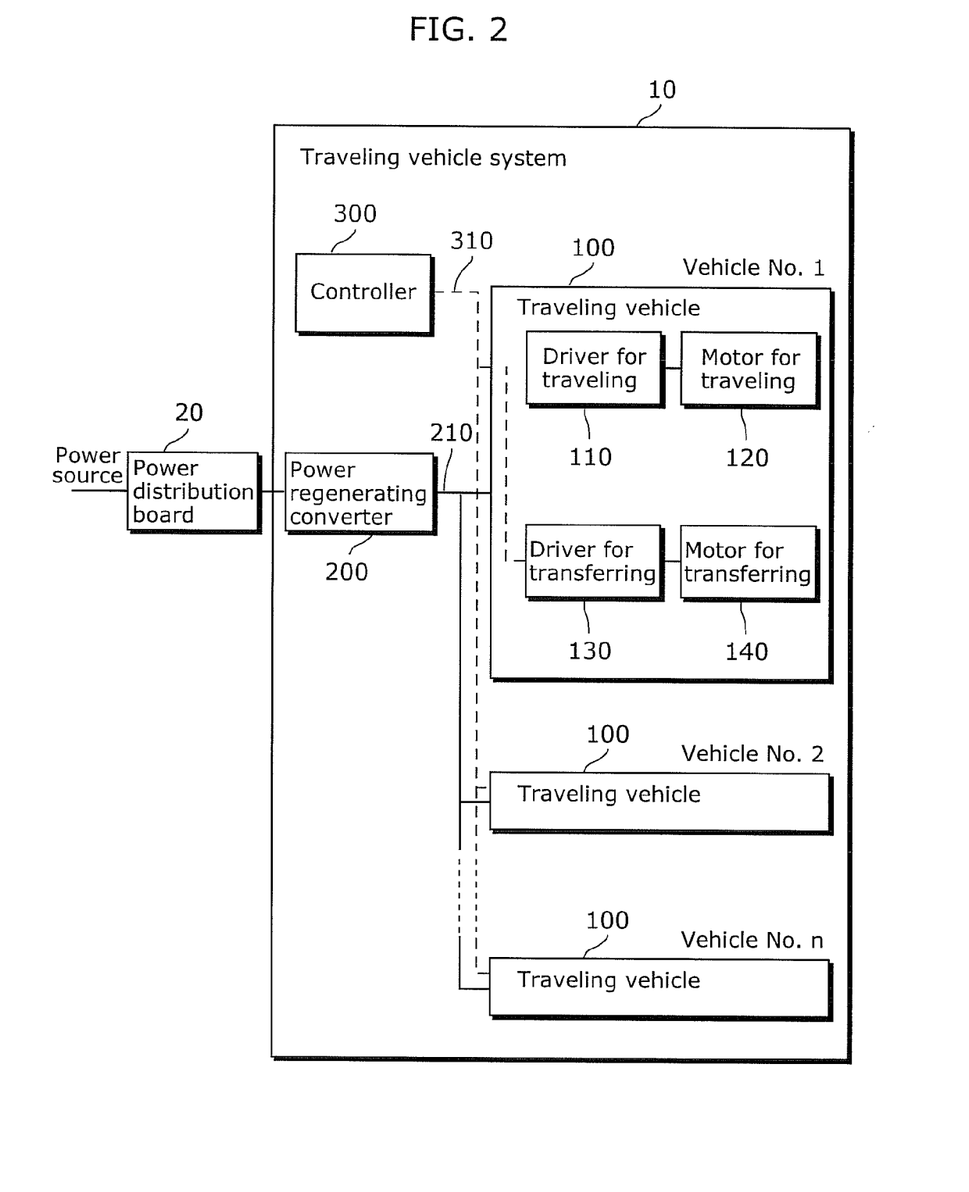
FIG. 2 is a block diagram showing a structure of the traveling vehicle system according to a preferred embodiment of the present invention.

FIG. 2 is a block diagram showing a structure of traveling vehicle system 10 according to a preferred embodiment of the present invention.

As shown in FIG. 2, the traveling vehicle system 10 includes a power regenerating converter 200, a power line 210, and a communication line 310 in addition to the traveling vehicles 100 and the controller 300 shown in FIG. 1.

The power regenerating converter 200 obtains AC power from a power distribution board 20, converts the AC power into DC power, and supplies the DC power to each of the traveling vehicles 100 via the power line 210.

The power line 210 electrically connects the traveling vehicles 100 with each other, and supplies the electric power to each traveling vehicle 100.

Each of the traveling vehicles 100 (n traveling vehicles from Vehicle No. 1 to Vehicle No. n in FIG. 2) is operated by the power supplied via the power line 210. Furthermore, each traveling vehicle 100 generates, when decelerating, regenerative electric power to be supplied to another traveling vehicle. In other words, the generated regenerative electric power is used to operate another traveling vehicle 100.

Here each of the traveling vehicles 100 includes a driver for traveling 110, a motor for traveling 120, a driver for transferring 130, and a motor for transferring 140.

The motor for traveling 120, such as a servo motor, operates on the power supplied via the power line 210, and drives the traveling vehicle 100.

The driver for traveling 110, such as a servo amplifier for traveling, positions each of the traveling vehicles 100 by driving the motor for traveling 120. The driver for traveling 110 can obtain a torque value of the motor for traveling 120.

The motor for transferring 140, such as a servo motor, operates on the power supplied via the power line 210, and drives a transfer device (not shown) to transfer an article.

The driver for transferring 130, such as a servo amplifier for transferring, positions the transfer device by driving the motor for transferring 140.

The controller 300 has integrated control over the traveling vehicles 100. Specifically, the controller 300 controls the travel of the traveling vehicles 100 and the transfer of the articles by causing the driver for traveling 110 and the driver for transferring 130, both included in each of the traveling vehicles 100, to drive the motor for traveling 120 and the motor for transferring 140 via the communication line 310.

Furthermore, the controller 300 controls operations of the traveling vehicles 100 so that a time of one or more first traveling vehicles decelerating overlaps a time of one or more second traveling vehicles accelerating. Here the first traveling vehicles to decelerate and the second traveling vehicles to accelerate are included in the traveling vehicles 100.

For example, the controller 300 controls Traveling vehicle 100 No. 1 and Traveling vehicle 100 No. 2, so that a time of Traveling vehicle 100 No. 1 decelerating overlaps a time of Traveling vehicle 100 No. 2 accelerating. It is noted that how the controller 300 controls the operations of the traveling vehicles 100 shall be detailed later.

The communication line 310 connects the controller 300, the driver for traveling 110, and the driver for transferring 130 with each other. The driver for traveling 110 and the driver for transferring 130 are preferably included in each of the traveling vehicles 100.

Through a field network such as the Control and Communication Link (CC-Link), high-speed communication is held between (i) the controller 300 and (ii) the driver for traveling 110 and the driver for transferring 130 both of which are preferably included in each traveling vehicle 100. This high-speed communication makes possible real-time information transmission between the controller 300 and each of the traveling vehicles 100.

Detailed next is how the controller 300 controls the operations of the traveling vehicles 100.

Figure 3:
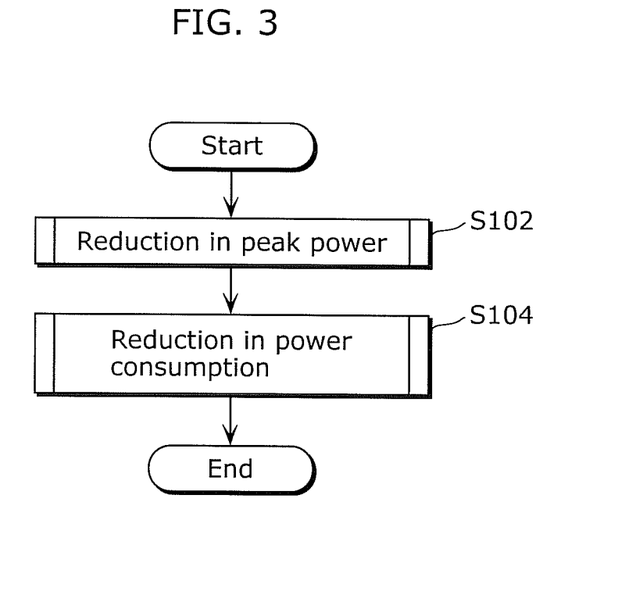
FIG. 3 is a flowchart exemplifying an operation carried out by a controller according to a preferred embodiment of the present invention.

FIG. 3 is a flowchart exemplifying an operation carried out by the controller 300 according to a preferred embodiment of the present invention.

As shown in FIG. 3, the controller 300 first executes a process for reducing the peak power of the electricity to be used for operating the traveling vehicles 100 (S102). The reduction of the peak power shall be detailed later.

Then the controller 300 reduces the power consumption among the traveling vehicles 100 (S104). In order to reduce the power consumption, the controller 300 controls the operations of the traveling vehicles 100, so that a time of one traveling vehicle 100 decelerating overlaps another the traveling vehicle 100 accelerating. The reduction of the power consumption shall be detailed later.

Detailed first is how the controller 300 reduces the peak power (S102 in FIG. 3).

Figure 4:
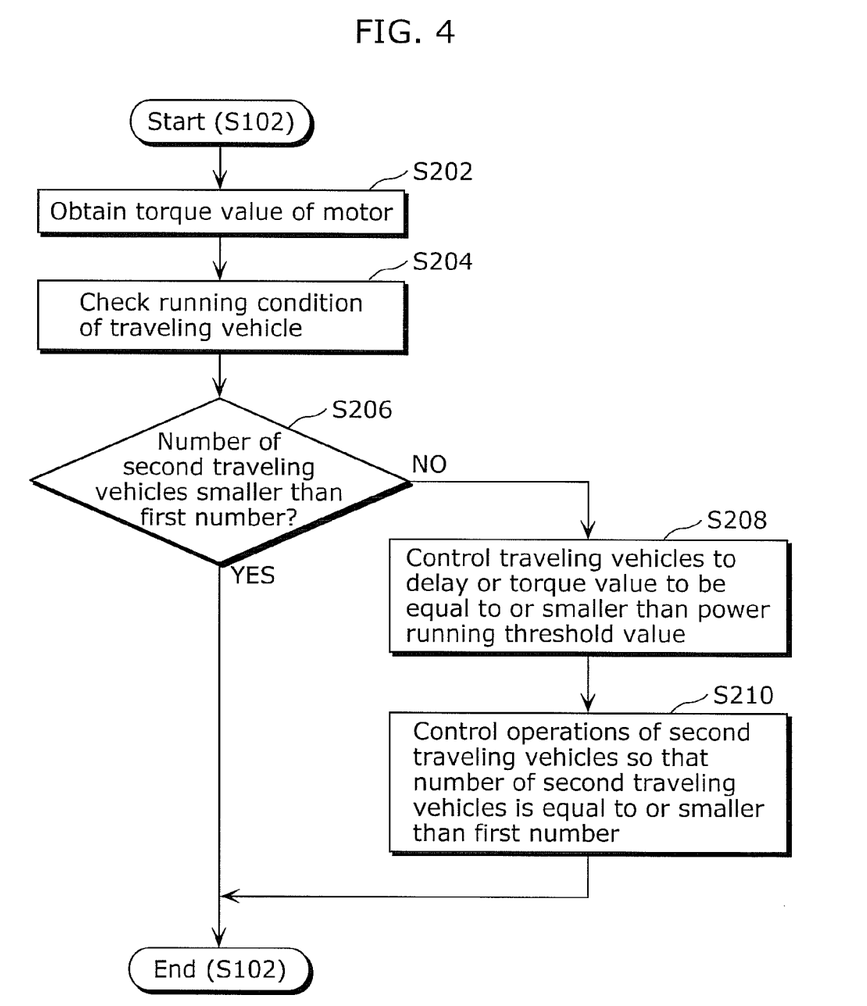
FIG. 4 is a flowchart exemplifying a peak power reducing operation carried out by the controller according to a preferred embodiment of the present invention.

FIG. 4 is a flowchart exemplifying a peak power reducing operation carried out by the controller 300 according to a preferred embodiment of the present invention.

As shown in FIG. 4, the controller 300 first obtains torque values of the motors for traveling 120 from the drivers for traveling 110 (S202).

Then the controller 300 checks the operating conditions of the traveling vehicles 100 (S204).

Described hereinafter is how the controller 300 checks the operating condition of the traveling vehicle 100.

Figure 5:
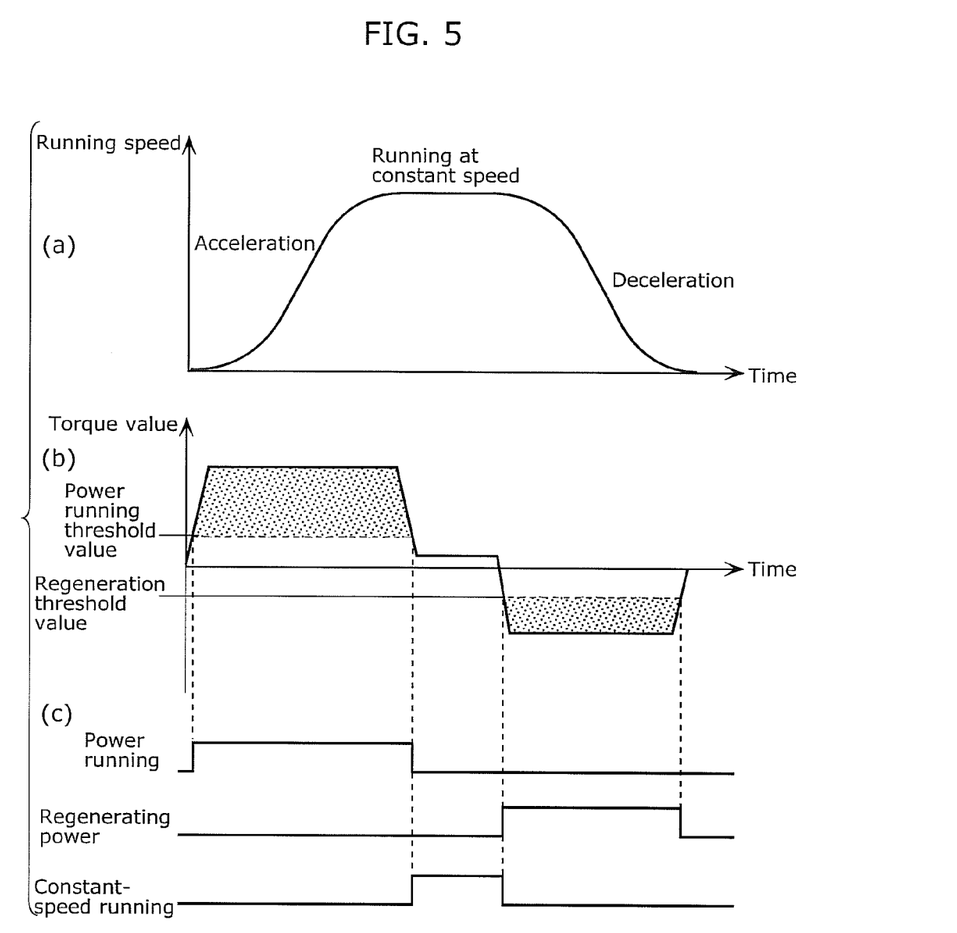
FIG. 5 shows how the controller according to a preferred embodiment of the present invention checks an operating condition of a traveling vehicle.

FIG. 5 shows how the controller 300 according to a preferred embodiment of the present invention checks the operating condition of the traveling vehicle 100.

As (a) in FIG. 5 shows, assume the case where the traveling vehicle 100 accelerates, operates at a constant speed, and decelerates.

When the traveling vehicles 100 is accelerating, the torque value of the motor for traveling 120 increases and exceeds a predetermined power running threshold value as (b) in FIG. 5 shows. Here, as (c) in FIG. 5 shows, the controller 300 checks to see that operating condition of the traveling vehicle 100 as the accelerating state (power running). In other words, the traveling vehicle 100 uses the power in the accelerating state.

Here the torque value of the motor for traveling 120 includes noise. Thus, when the torque value exceeds the predetermined power running threshold value, the controller 300 determines that the traveling vehicle 100 is power-running. It is noted that the power running threshold value may be any value, and that the power running threshold value is not necessarily set.

When the traveling vehicle 100 is operating at a constant speed, the torque value of the motor for traveling 120 is constant as (b) in FIG. 5 shows. Here, as (c) in FIG. 5 shows, the controller 300 checks to see that the operating condition of the traveling vehicle 100 is the constant-speed-operating state (constant-speed operating).

When the traveling vehicle 100 is decelerating, the torque value of the motor for traveling 120 decreases and goes below a predetermined regeneration threshold value as (b) in FIG. 5 shows. Here, as (c) in FIG. 5 shows, the controller 300 checks to see that the operating condition of the traveling vehicle 100 as the decelerating state (regenerating power). In other words, the traveling vehicle 100 generates regenerative electric power in the decelerating state.

Here the torque value of the motor for traveling 120 includes noise. Thus, when the torque value goes below the predetermined regeneration threshold value, the controller 300 determines that the traveling vehicle 100 is regenerating power. It is noted that the regeneration threshold value may be any value, and that the regeneration threshold value is not necessarily set.

Referring back to FIG. 4, the controller 300 determines whether or not the number of the second traveling vehicles is equal to or smaller than a predetermined first number (S206). Here the second traveling vehicles are accelerating traveling vehicles 100. It is noted that the predetermined first number is determined by the user based on a value of the peak power to be reduced, and shall not be limited.

When the controller 300 determines that the number of the second traveling vehicles is equal to or smaller than the predetermined first number (S206: YES), the process ends.

When the controller 300 determines that the number of the second traveling vehicles is greater than the predetermined first number (S206: NO), the controller 300 either (i) delays the acceleration of the other traveling vehicles 100 or (ii) controls the acceleration of the other traveling vehicles 100 so that the torque values of the motors for traveling 120 are equal to or smaller than the power running threshold value (S208).

Then the controller 300 controls the operation of the second traveling vehicles so that the number of the second traveling vehicles is equal to or smaller than the predetermined first number (S210). Hence, the controller 300 decreases the number of the accelerating traveling vehicles 100 in order to reduce the peak power.

Then the reducing process of the peak power by the controller 300 (S102 in FIG. 3) ends.

Detailed next is how the controller 300 reduces the power consumption (S104 in FIG. 3).

Figure 6:
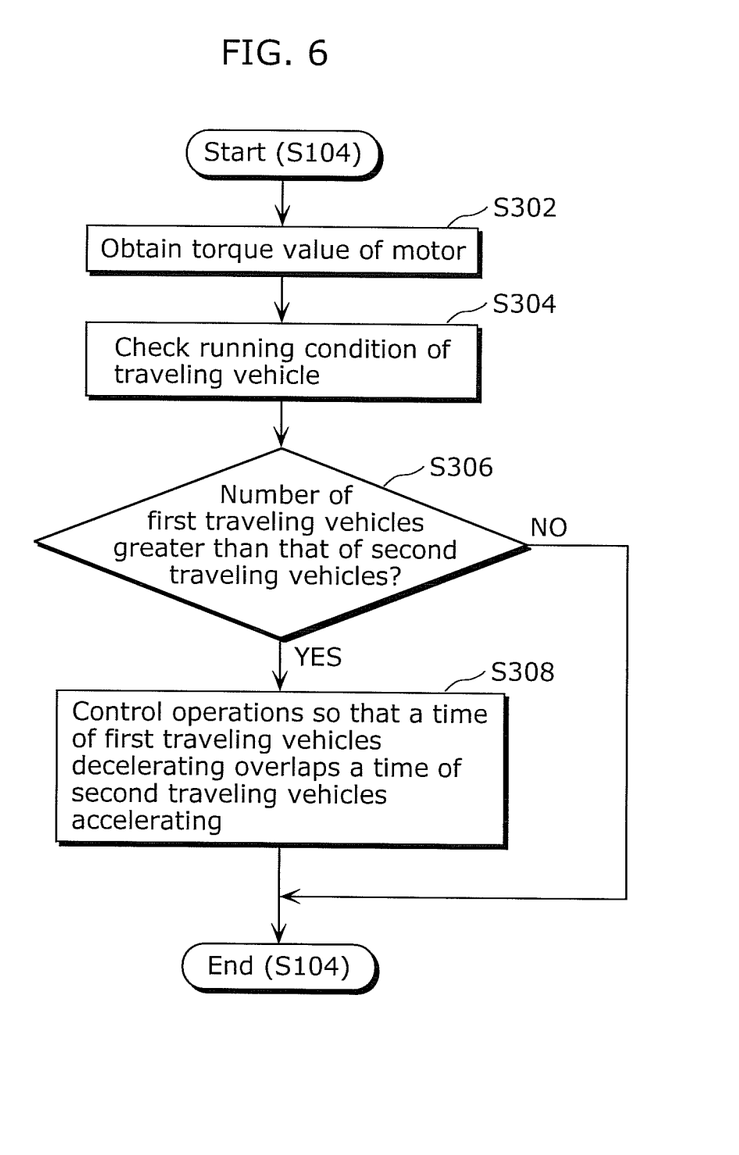
FIG. 6 is a flowchart exemplifying a power consumption reducing operation carried out by the controller according to a preferred embodiment of the present invention.

FIG. 6 is a flowchart exemplifying a power consumption reducing operation carried out by the controller 300 according to a preferred embodiment of the present invention.

As shown in FIG. 6, the controller 300 first obtains torque values of the motors for traveling 120 from the drivers for traveling 110 (S302).

Then the controller 300 checks the operating conditions of the traveling vehicles 100 (S304). In other words, the controller 300 refers to the torque values, of the motor for traveling 120, which the drivers for traveling 110 obtain, and determines that (i) a decelerating traveling vehicle 100 is in the decelerating state and (ii) an accelerating traveling vehicle 100 is in the accelerating state. Thus, the controller 300 can check the operating condition of the traveling vehicles 100. It is noted that the controller 300 can check the operating conditions of the traveling vehicles 100 as shown in FIG. 4 (S204 in FIG. 4). Hence, the detailed description of the check shall be omitted.

Next, the controller 300 refers to the checking result of the operating conditions of the traveling vehicles 100 in order to determine whether or not the number of the first traveling vehicles is greater than that of the second traveling vehicles (S306). Here the first traveling vehicles are decelerating traveling vehicles 100, and the second traveling vehicles are accelerating traveling vehicles 100.

When the controller 300 determines that the number of the first traveling vehicles is equal to or smaller than that of the second traveling vehicles (S306: NO), the process ends.

When the controller 300 determines that the number of the first traveling vehicles is greater than that of the second traveling vehicles (S306: YES), the controller 300 controls the operations of the first traveling vehicles and the second traveling vehicles so that a time of the first traveling vehicles accelerating overlaps a time of the second traveling vehicles decelerating (S308). As described above, the controller 300 utilizes the regenerative electric power generated by the first traveling vehicles for the operations of the second traveling vehicles in order to reduce the power consumption.

Described next is another example of how the controller 300 reduces the power consumption (S104 in FIG. 3).

Figure 7:
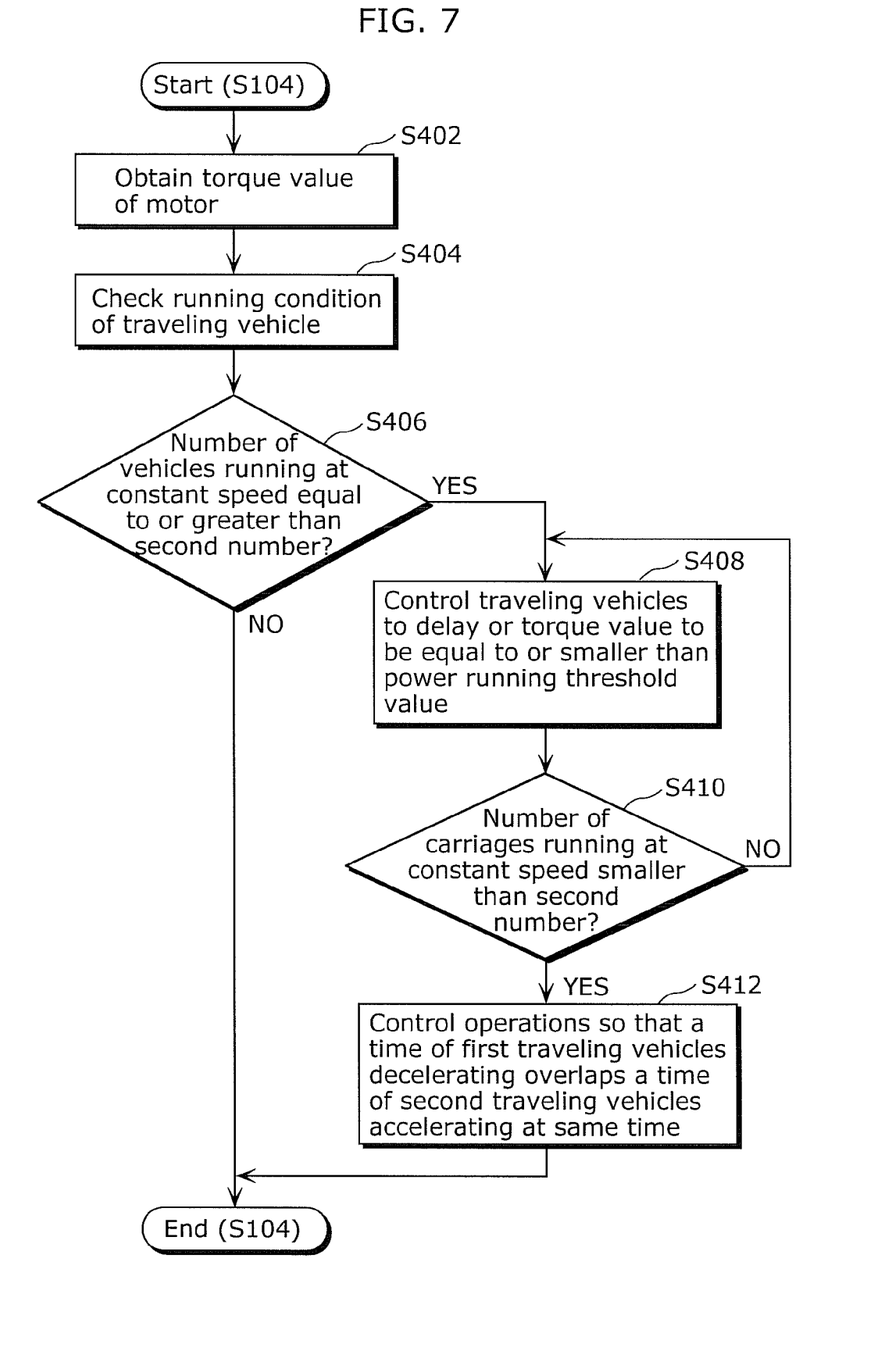
FIG. 7 is a flowchart exemplifying another power consumption reducing operation carried out by the controller according to a preferred embodiment of the present invention.

FIG. 7 is a flowchart exemplifying another power consumption reducing operation carried out by the controller 300 according to a preferred embodiment of the present invention.

As shown in FIG. 7, the controller 300 first obtains torque values of the motors for traveling 120 from the drivers for traveling 110 (S402).

Then the controller 300 checks the operating conditions of the traveling vehicles 100 (S404). It is noted that the controller 300 can check the operating conditions of the traveling vehicles 100 as shown in FIGS. 4 and 6 (S204 in FIG. 4 and S304 in FIG. 6). Hence, the detailed description of the check shall be omitted.

Next, the controller 300 refers to the checking result of the operating conditions of the traveling vehicles 100, and determines whether or not the number of the traveling vehicles 100 operating at a constant speed is equal to or greater than a predetermined second number (S406). It is noted that the predetermined second number is determined by the user based on a value of the peak power to be reduced, and shall not be limited.

When the controller 300 determines that the number of the traveling vehicles 100 operating at a constant speed is smaller than the predetermined second number (S406: NO), the process ends.

When determining that the number of the traveling vehicles 100 operating at a constant speed is equal to or greater than the predetermined second number (S406: YES), the controller 300 expects that the operating traveling vehicles 100 are to decelerate and generate regenerative electric power. Based on the expectation, the controller 300 either (i) delays the acceleration of the other traveling vehicles 100 or (ii) controls the acceleration of the other traveling vehicles 100 so that the torque values of the motors for traveling 120 are equal to or smaller than the power running threshold value (S408).

Then the controller 300 determines whether or not the number of the traveling vehicles 100 operating at a constant speed is smaller than the predetermined second number (S410).

When determining that the number of the traveling vehicles 100 operating at a constant speed is equal to the predetermined second number or greater (S410: NO), the controller 300 repeatedly either (i) delays the acceleration of the other traveling vehicles 100 or (ii) controls the acceleration of the other traveling vehicles 100 so that the torque values of the motors for traveling 120 are equal to or smaller than the power running threshold value (S408).

When determining that the number of the traveling vehicles 100 operating at a constant speed is smaller than the predetermined second number (S410: YES), the controller 300 determines that the traveling vehicles 100 operating at a constant speed start decelerating, and controls the operations of the first traveling vehicles and the second traveling vehicles so that a time of the first traveling vehicles accelerating overlaps a time of the second traveling vehicles decelerating (S412). Here the first traveling vehicles are decelerating traveling vehicles 100, and the second traveling vehicles are accelerating vehicles.

Hence, the controller 300 delays the acceleration of the other traveling vehicles 100 until the traveling vehicles 100 operating at a constant speed start decelerating by anticipating when the traveling vehicles 100 operating at a constant speed will decelerate and generate the regenerative electric power. In order to reduce the power consumption, as described above, the controller 300 utilizes the regenerative electric power generated by the first traveling vehicles for the operations of the second traveling vehicles.

Then the reducing process of the power consumption by the controller 300 (S104 in FIG. 3) ends.

The traveling vehicle system 10 according to a preferred embodiment of the present invention controls traveling vehicles 100, so that a time of the first traveling vehicles accelerating overlaps the second traveling vehicles decelerating. In other words, the traveling vehicle system 10 causes the first traveling vehicles to decelerate and the second traveling vehicles to accelerate at the same time in order to use the regenerative electric power generated by the decelerating first traveling vehicles to accelerate the second traveling vehicles. Accordingly, the traveling vehicle system 10 suffers no loss of power resulting from storing and discharging of the regenerative electric power, and can efficiently use the regenerative electric power. In addition, the traveling vehicle system 10 eliminates the need for a device to charge with the regenerative electric power, so that the traveling vehicles 100 can be reduced in size and weight.

The controller 300 controls the operations of the traveling vehicles 100 so that the number of the second traveling vehicles is equal to or smaller than a predetermined number. In other words, the controller 300 limits the number of the accelerating traveling vehicles 100 to be equal to or smaller than the predetermined number. This control makes possible prevention of increases in peak power caused by the accelerating traveling vehicles 100, which contributes to reducing the capacity of the power supply facility.

Furthermore, when the number of the first traveling vehicles is greater than that of the second traveling vehicles, the controller 300 controls the operations of the traveling vehicles 100 so that a time of the first traveling vehicles decelerating overlaps the second traveling vehicles accelerating. Specifically, in the case where the number of decelerating traveling vehicles 100 is greater than that of the accelerating traveling vehicles 100, the controller 300 uses the regenerative electric power generated by the deceleration of the traveling vehicles 100 for the acceleration of the traveling vehicles 100. This control allows much regenerative electric power to be provided to the accelerating traveling vehicles 100. Thus, the regenerative electric power is efficiently used, contributing to preventing the increase in power to be used for acceleration of the traveling vehicles 100.

The controller 300 controls the operations of the traveling vehicles 100 by causing the drivers for traveling 110 to drive the motors for traveling 120 via the communication line 310, so that a time of the first traveling vehicles decelerating overlaps a time of the second traveling vehicles accelerating. The controller 300 sends signals which cause the drivers for traveling 110, including servo amplifiers, to drive the motors for traveling 120. Accordingly, the traveling vehicles 100 can be easily controlled.

The controller 300 controls the operations of the traveling vehicles 100 by checking to see that each of the first traveling vehicles is in the decelerating state based on the torque value of the motor for traveling 120 which the driver for traveling 110 obtains, so that a time of the first traveling vehicles decelerating overlaps a time of the second traveling vehicles accelerating. Thus, the controller 300 uses the torque values to check the decelerating state of the traveling vehicles 100. Accordingly, the traveling vehicles 100 can be easily controlled.

The controller 300 controls the operations of the traveling vehicles 100 by checking to see that each of the second traveling vehicles is in the accelerating state based on the torque value of the motor for traveling 120 which the driver for traveling 110 obtains, so that a time of the first traveling vehicles decelerating overlaps a time of the second traveling vehicles accelerating. Thus, the controller 300 uses the torque values to check the accelerating state of the traveling vehicles 100. Accordingly, the traveling vehicles 100 can be easily controlled.

The controller 300 delays the acceleration of the second traveling vehicles by estimating when the first traveling vehicles will decelerate and generate the regenerative electric power, so that a time of the first traveling vehicles decelerating overlaps a time of the second traveling vehicles accelerating. Thus, the controller 300 estimates when the regenerative electric power will be generated. Accordingly, the traveling vehicles 100 can be easily controlled.

The controller 300 delays the acceleration of the traveling vehicles 100 by anticipating that the operating traveling vehicles 100 are to decelerate and generate the regenerative electric power when the number of the traveling vehicles 100 operating at a constant speed is greater than a predetermined number. In other words, when there are many of the traveling vehicles 100 operating at a constant speed, the operating traveling vehicles 100 are expected to sequentially decelerate. In order to efficiently use the regenerative electric power to be generated through the deceleration of the operating traveling vehicles 100, the controller 300 delays the acceleration of the other traveling vehicles 100. Thus, the regenerative electric power is efficiently used, contributing to preventing the increase in power to be used for acceleration of the traveling vehicles 100.

Although exemplary preferred embodiments of this invention has been described in detail above, those skilled in the art will readily appreciate that many modifications are possible in the exemplary preferred embodiments without materially departing from the novel teachings and advantages of this invention.

Accordingly, all such modifications are intended to be included within the scope of this invention.

In the above preferred embodiments, for example, the controller 300 preferably carries out processes to reduce the peak power and the power consumption. Alternatively, the controller 300 does not necessarily carry out the processes. The controller 300 may carry out such processes only when the processes need to be executed. The situation in which no such processes are needed is when there is a small amount of articles to be conveyed and a large enough power to use.

The preferred embodiments described above also describes that the controller 300 preferably checks to see that the operating condition of the traveling vehicle 100 is the decelerating state (regenerating power). In addition to checking to see the operating condition of the traveling vehicle 100 is the decelerating state, the controller 300 may obtain the value of the regenerative electric power generated by the traveling vehicle 100. This feature allows the controller 300 to monitor the value of the regenerative electric power to be generated. Thus, the control method used by the controller 300 can be changed based on the amount of the regenerative electric power. Accordingly, the regenerative electric power can be used more efficiently.

It is noted that the term "time" in the above preferred embodiments is preferably used to describe the control is carried out so that the acceleration time zone and the deceleration time zone overlaps, not to specify an actual date and time.

Instead of being implemented as the traveling vehicle system 10, other preferred embodiments of the present invention can be implemented as (i) a method to control a traveling vehicle system 10, the method which has characteristic processes included in the controller 300 of the traveling vehicle system 10 as steps, and (ii) a program causing a computer to execute such characteristic steps. As a matter of course, such a program can be distributed via a recording medium, such as a CD-ROM, and a transmission medium, such as the Internet.

Various preferred embodiments of the present invention can be used as a traveling vehicle system which effectively utilizes regenerative electric power.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A traveling vehicle system comprising:
    a plurality of traveling vehicles;
    a controller which controls operations of the plurality of traveling vehicles; and
    a power line which electrically connects the plurality of traveling vehicles with each other, and supplies electric power to each of the plurality of traveling vehicles; wherein
    each of the plurality of traveling vehicles (i) includes a motor which runs on the electric power supplied via said power line and drives the respective traveling vehicle, and (ii) when decelerating, generates regenerative electric power to be supplied to another one of the plurality of traveling vehicles via said power line;
    said controller controls the operations of the plurality of traveling vehicles so that a time when one or more first traveling vehicles of the plurality of traveling vehicles decelerates overlaps a time when one or more second traveling vehicles of the plurality of traveling vehicles accelerates, said first traveling vehicles being decelerating traveling vehicles, and said second traveling vehicles being accelerating traveling vehicles; and
    when the number of said first traveling vehicles is greater than the number of said second traveling vehicles, said controller controls the operations of the plurality of traveling vehicles so that a time of said first traveling vehicles decelerating overlaps a time of said second traveling vehicles accelerating.

2. The traveling vehicle system according to claim 1, wherein said controller controls the operations of the plurality of traveling vehicles so that the number of said second traveling vehicles is equal to or smaller than a predetermined first number.

3. The traveling vehicle system according to claim 1,
    wherein each of the plurality of traveling vehicles further includes a driver which positions each of the plurality of traveling vehicles by driving said motor;
    said traveling vehicle system further includes a communication line which connects said controller with each driver; and
    said controller controls the operations of the plurality of traveling vehicles by causing said driver to drive said motor via said communication line, so that the time of said first traveling vehicles decelerating overlaps the time of said second traveling vehicles accelerating.

4. The traveling vehicle system according to claim 3,
    wherein said driver obtains a torque value of said motor of the respective traveling vehicle, and said controller controls the operations of the plurality of traveling vehicles by checking to see that each of said first traveling vehicles is in a decelerating state based on the torque value of said motor which said driver obtains, so that the time of said first traveling vehicles decelerating overlaps the time of said second traveling vehicles accelerating.

5. The traveling vehicle system according to claim 3,
    wherein said driver obtains a torque value of said motor of the respective traveling vehicle, and said controller controls the operations of the plurality of traveling vehicles by checking to see that each of said second traveling vehicles is in an accelerating state based on the torque value of said motor which said driver obtains, so that the time of said first traveling vehicles decelerating overlaps the time of said second traveling vehicles accelerating.

6. The traveling vehicle system according to claim 1,
    wherein said controller delays the acceleration of said second traveling vehicles by estimating when said first traveling vehicles will decelerate and generate the regenerative electric power, so that the time of said first traveling vehicles decelerating overlaps the time of said second traveling vehicles accelerating.

7. The traveling vehicle system according to claim 6, wherein
    when a number of the plurality of traveling vehicles operating at a constant speed is equal to or greater than a predetermined number, said controller estimates that one or more of the plurality of traveling vehicles will decelerate as said first traveling vehicles and generate the regenerative electric power; and
    in response to estimating that the number of the plurality of traveling vehicles will decelerate as said first traveling vehicles, said controller delays the acceleration of said second traveling vehicles.

8. A traveling control method for controlling operations of a plurality of traveling vehicles in a traveling vehicle system including the plurality of traveling vehicles and a power line which electrically connects the plurality of traveling vehicles with each other, and supplies electric power to each of the plurality of traveling vehicles, said traveling control method comprising:
    when any of the plurality of traveling vehicles is decelerating, generating regenerative electric power to be supplied to another one of the plurality of traveling vehicles via the power line by supplying electric power to each of the plurality of traveling vehicles via the power line and operating the plurality of traveling vehicles;
    controlling, by a controller, the operations of the plurality of travelling vehicles so that a time when one or more first travelling vehicles of the plurality of traveling vehicles decelerates overlaps a time when one or more second travelling vehicles of the plurality of traveling vehicles accelerates, the first travelling vehicles being decelerating traveling vehicles, and the second travelling vehicles being accelerating traveling vehicles; and
    when the number of said first traveling vehicles is greater than the number of said second traveling vehicles, controlling, by the controller, the operations of the plurality of traveling vehicles so that a time of said first traveling vehicles decelerating overlaps a time of said second traveling vehicles accelerating.

* * * * *